Feb. 27, 1940.  C. G. OLSON  2,191,771
FASTENER
Filed Sept. 16, 1937
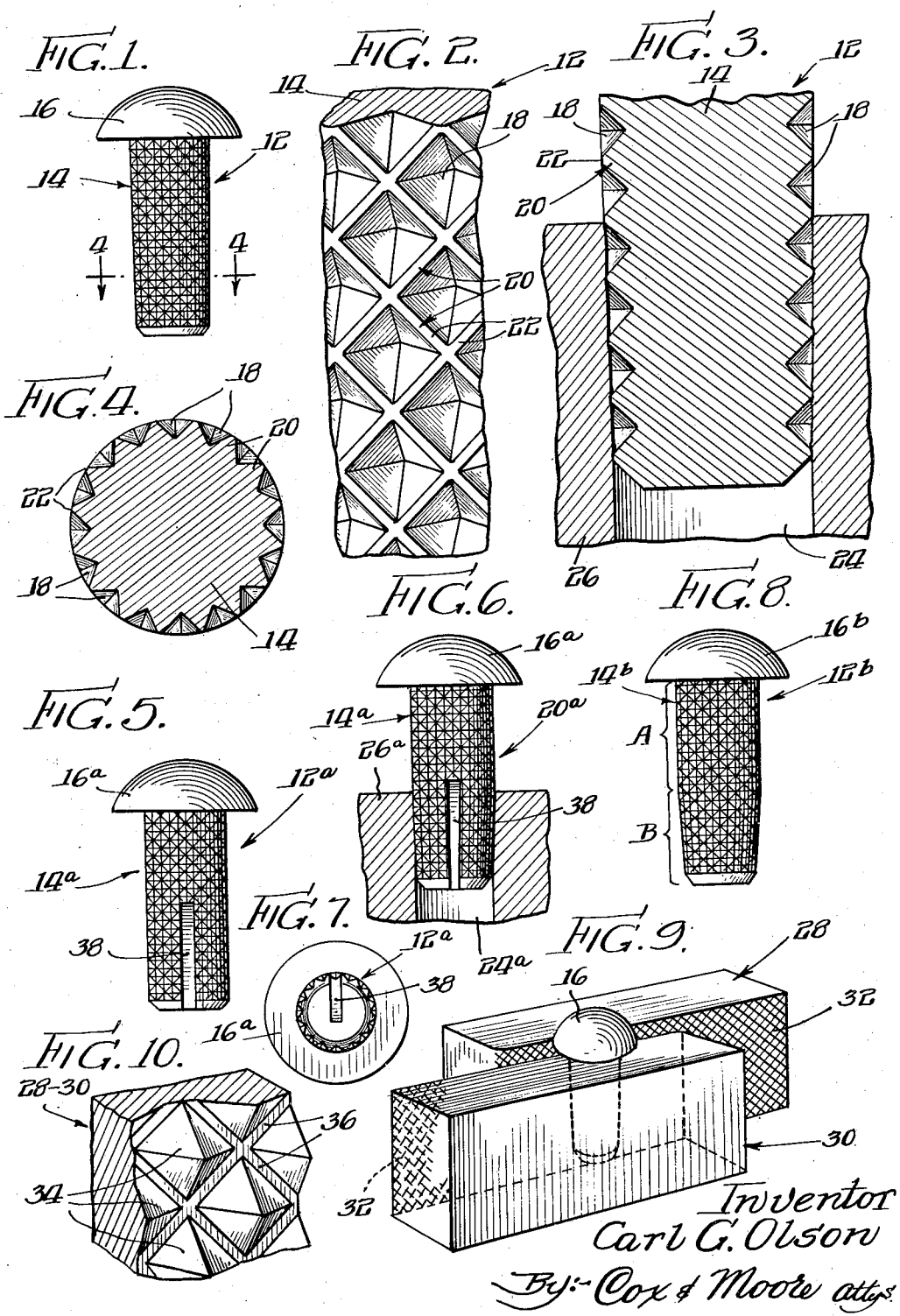
Inventor
Carl G. Olson
By: Cox & Moore attys Patented Feb. 27, 1940

2,191,771

UNITED STATES PATENT OFFICE 2,191,771

FASTENER

Carl G. Olson, Chicago, Ill., assignor to Illinois Tool Works, Chicago, Ill., a corporation of Illinois Application September 16, 1937, Serial No. 164,112

3 Claims. (Cl. 85—21)

This invention relates generally to fasteners, and more particularly to fasteners of the hammer-driven type.

It is an object of the present invention to provide a hammer-driven fastener having improved locking characteristics, and which may be very economically manufactured.

The invention contemplates a fastener of the hammer-driven type which is "self-sizing", namely, a fastener which, when driven into an aperture slightly smaller in diameter than the peripheral diameter of the fastener, will make a perfect tight fit against the peripheral surface surrounding said aperture. More specifically, such a fastener may be referred to as one which is adapted to make a perfect driving fit, as distinguished from conventional fasteners of the hammer-driven type, which depend solely upon the embedding of longitudinal ribs and the like within the work surface which surrounds the aperture. Such conventional devices require that the material of the work be "indented" or "flowed", whereas the present invention contemplates a fastener which is adapted to "broach" its way into the aperture of the work, and thus self-size the hole so as to produce a perfectly smooth surface in snug engagement with the peripheral areas of the fastener.

With the foregoing objects in mind, I propose to provide a hammer-driven fastener in which the peripheral surface is interrupted by a plurality of adjacently positioned indentations which may be formed in a very economical manner, for example, by rolling dies, the peripheral surface areas remaining between said indentations serving to tightly engage or impinge the surface of the work.

More specifically, the invention contemplates a fastener, as set forth above, wherein the peripheral sections bounding the peripheral indentations will serve to shave or broach the aperture of the work as the fastener is hammer-driven longitudinally therein, this broaching action serving to effect a perfect snug fit between the peripheral surface areas of the fastener and the complementary internal surface areas of the work.

Still more specifically, the invention contemplates hammer-driven fasteners, wherein the peripheral work engaging surface areas present a criss-cross or checkerlike pattern, said checkered area being sufficient in size to positively secure the fastener against inadvertent loosening when snugly engaging the complementary surface areas of the work.

It is also an object of the present invention to provide methods whereby the above mentioned indentations may be produced within a minimum amount of effort and expense, and to this end I propose to roll a fastener blank, preferably a blank which is slightly tapered, between a pair of die members having the working surfaces thereof provided with a plurality of protuberances which are adapted to form said indentations.

The foregoing and other objects and advantages will be more apparent from the following detailed description when considered in connection with the accompanying drawing, wherein—

Figure 1 is a side elevational view of a hammer-driven fastener embodying features of the present invention;

Figure 2 is a perspective enlargement of a section of the periphery of the fastener of Figure 1, to more clearly illustrate the structural characteristics of the work engaging peripheral surface areas and the interposed indentations;

Figure 3 is an enlarged longitudinal sectional view of a fragmentary portion of the fastener, partially driven into an unthreaded aperture in a work piece, to more clearly illustrate the manner in which the peripheral surface sections function to scrape or broach the aperture in effecting a perfect snug fit between the peripheral surface areas of the fastener and the complementary surface areas of the work;

Figure 4 is an enlarged transverse sectional view of the body of the fastener taken substantially along the line 4—4 of Figure 1;

Figure 5 is a side elevational view of a fastener similar to the fastener of Figure 1, provided with a recess entering extremity whereby to facilitate driving the fastener into relatively thick stock;

Figure 6 discloses the fastener of Figure 5 partially driven into a sectionally disclosed apertured work piece, to more clearly illustrate the manner in which the entering extremity of the fastener is adapted to collapse and thereby facilitate driving the fastener into a relatively thick work piece;

Figure 7 is an end view of the entering extremity of the fastener shown in Figure 5;

Figure 8 is a side elevational view of a hammer-driven fastener slightly modified in form from the fastener shown in Figures 1 to 7, inclusive, to-wit: A fastener in which the protuberances on the portion of the body in the vicinity of the head are of substantially constant height and the remaining portions decrease in height toward the entering extremity of the fastener, or, in other words, the fastener at its entering end decreases in external diameter;

Figure 9 discloses means whereby my improved method of rolling the indentations on the periphery of a fastener blank may be practiced, said means including a pair of relatively shiftable die members having protuberances provided along the working surfaces thereof; and Figure 10 is an enlarged fragmentary perspective view of a surface portion of one of the die blocks of Figure 9 to more clearly illustrate the structural arrangement of the working surfaces of the die members.

Referring now to the drawing more in detail wherein like numerals have been employed to designate similar parts throughout the various figures, it will be seen that one embodiment of the invention, as illustrated in Figures 1 to 4, inclusive, comprises a fastener designated generally by the numeral 12. This fastener includes a body portion 14 and a head 16 formed integral therewith. The body portion 14, over substantially its entire extent, is provided with a plurality of peripheral pyramidal indentations 18, as is more clearly illustrated in Figures 2 and 3. These indentations 18 are bounded by work engaging sections 20, the outer or peripheral surface areas 22 of said sections in the aggregate presenting a criss-cross or checkerlike pattern along the fastener periphery. The spacing of the indentations 18 will obviously determine the width of the surface areas 22.

I prefer to form the fastener body 14 with a slight taper toward the entering end to facilitate driving the body into an aperture of a work piece, for example, the aperture 24 of the work piece 26 shown in Figure 3. The work engaging sections 20 serve to scrape or broach the internal peripheral surface of the work when the fastener is hammer-driven into the aperture. It will be understood that the diameter of the aperture 24 is only slightly less than the entering peripheral diameter of the fastener and, as the fastener is driven into the aperture, the sections 20 broach or shave the work surface so as to ultimately produce a perfect snug fit between the peripheral surface areas 22 and the complementary surface areas of the work. Thus the peripheral sections 20 actually function as broaching or scraping members, and the indentations or recesses 18 serve as reservoirs to receive the work which is scraped or broached from the work surface. It will be apparent that the effective holding of the fastener within the work is accomplished by the self-sizing action of the fastener in so broaching the aperture of the work as to ultimately produce a perfect and tight surface engagement between the peripheral surface areas of the fastener and the internal peripheral surface of the work. By providing the recesses or indentations 18, any tendency for the material of the work to crowd or flow, so as to set up excessive resistance to the longitudinal force acting upon the fastener, is obviated. That is to say, the material which is scraped by the sections 20 is free to extend into or be received by the recesses 18. The tight or perfect fit between the peripheral surfaces 22 of the fastener and the complementary surface areas of the work is relied upon to secure the fastener in a fixed position against inadvertent withdrawal. While it is true that the fastener may have a smaller work engaging surface area than the surface of the hole formed in driving it, the metal of the fastener, which is harder than the work, will withstand as much pressure as the work material. The tendency for the softer work material to expand slightly into the indentations 18, due to the pressure of the peripheral surface portions 22 acting upon the work, cooperates in setting up additional and effective resistance against loosening or withdrawal. In Figure 3 this slight tendency of the work to spring into the indentations 18 has been somewhat exaggerated to more clearly illustrate this functional characteristic.

Referring to Figures 9 and 10, it will be seen that the peripheral configurations illustrated in Figures 1 to 4, inclusive, may be produced by the use of a pair of rolling dies 28 and 30. Each die is provided with a working surface 32 of identical design, said working surfaces having formed thereon a plurality of pyramidal projections or protuberances 34 more clearly illustrated in Figure 10. These pyramidal protuberances form the indentations 18 when the screw blank is rolled between the dies 28—30, as clearly indicated in Figure 9. The criss-cross or checkered die surface areas 36 (Figure 10) cooperate with the protuberances 34 in forming the peripheral surface areas 22 of the fastener 12. From the foregoing it will be apparent that the working surfaces of the dies 28—30 must be complementary to the surface to be formed on the fastener blank.

In the rolling of the fastener surface just described, this surface configuration is produced gradually as the blank rolls from one end to the other of the die members. In the present instance the contacting or working surface of the die comprises a series of sharp points or protuberances 34, which start to roll the surface of the blank in accordance with the diameter of the blank. In other words, the actual rolling is on the surface of the blank. As the points of the die sink into the blank, different rolling circles are established due to the smaller diameter established at the point entering the blank. To compensate for any slipping which might occur between the top or bottom of the impression and thereby prevent the material from being abused during the rolling, I propose to gradually reduce the pitch of the formation in the die to progressively conform to new rolling diameters as the die sinks into the surface. Thus I propose to so space the protuberances or projections 34 as to gradually decrease the spacing of these protuberances toward the finishing end of the die to a degree which will comply substantially with the root circumference of the corrugation at this end, to thereby produce a clean cut finished article. Thus the die is provided with a work or generating surface comprising teeth or projections which conform in spacing at one end to a measurement which is a multiple of the circumference of a blank to be rolled, and the spacing of the projections on said generating surface gradually decreasing or loosening to a measurement conforming substantially to an equal multiple of the root circumference of the impressions made in the blank. Stating it in another way, the pitch of the die decreases toward the finishing end to conform to a rolling diameter of the blank which is smaller than the original blank.

In Figure 5 I have disclosed a slightly modified hammer-driven fastener which is designated generally by the numeral 12a. This fastener includes a body portion 14a and a head 16a formed integral therewith. This fastener is preferably of uniform external diameter, as distinguished from the slightly tapered body of the fastener 12 and is provided with a longitudinal recess or slot 38, which partially traverses the fastener body, as clearly illustrated in Figures 5 and 7. This slot is provided to facilitate driving the fastener into work pieces of relatively great thickness. As illustrated in Figure 6, when the fastener 12a is driven into an aperture 26a of a work piece 26a, the presence of the slot 38 permits the bifurcated sections of the fastener to collapse toward each other, thereby reducing the resistance set up by the engagement of the peripheral surface areas of the fastener with the complementary peripheral surface areas of the work. This fastener may either be formed cylindrical, as illustrated in Figures 5 to 7, inclusive, or it may be provided with a slight taper, as illustrated in Figure 1.

In Figure 8 another modification is illustrated and is designated generally by the numeral 12b. This fastener includes a body portion 14b and a head 16b formed integral therewith. The portion of the fastener 12b indicated by the bracket A is uniform in external diameter, whereas the entering portion of the fastener indicated by the bracket B is tapered to facilitate entrance within the work. The fastener 12b differs from the fastener 12 in the combined cylindrical and tapered body portions. In some instances it may be preferable to employ the fastener illustrated in Figure 8 rather than the fastener 12 illustrated in Figure 1.

From the foregoing it will be apparent that the present invention contemplates an improvement in the art of fastening, particularly as applied to those fasteners commonly known in the trade as hammer-driven fasteners. By having the pyramidal indentations or recesses distributed along the periphery of the fastener as described, a plurality of effective work engaging sections is provided. These sections, when driven into the work, serve to effectively broach the aperture of the work, thereby effecting the self-sizing of the work aperture so as to produce a perfect snug fit between the peripheral surfaces of the fastener and the complementary surface areas of the work, and thereby absolutely prevent inadvertent withdrawal of the fastener. The disposition of the broaching elements along the peripheral surface of the fastener is such as to prevent the fastener from experiencing rotation when longitudinally driven into the apertured work piece. Furthermore, the novel method contemplated herein for forming the aforesaid surface configuration on the fastener makes for economy in production and positively insures the production of uniformly shaped and sized broaching sections which, when driven into the work, will uniformly act to broach and thereby automatically size the aperture of the work for perfect fitting with the fastener.

While for purposes of illustration I have disclosed certain specific embodiments herein, it will be understood that the invention is by no means limited to this specific disclosure, but contemplates other modifications and changes without departing from the scope of the claims hereunto appended. It will be understood that the art of thread rolling is based upon the moulding generating principle, and hence the working surfaces of the die blocks, for example, the protuberances referred to herein, must be formed in accordance with this moulding generating principle to produce the desired configuration upon the surface of the blank. Obviously the invention is not limited to the specific criss-cross construction disclosed herein, but comprehends other criss-cross configurations which come within the spirit and scope of the claims appended hereto.

Particular attention is directed to the fact that each pair of intersecting peripheral surfaces 22 presents a pair of shearing edges. These edges being helically disposed in opposite directions, broach by a shearing action when driven into the work piece. This enables the broaching action to take place with less resistance and thereby enables the head of the fastener to be finally driven home tightly against the work piece. In other words, no rebounding of the fastener takes place when it is finally driven home. The external diameter of the fastener body is determined by the peripheral work engaging surface portions 22, and by reason of the presence of the recesses or indentations in the periphery of the body, the effective broaching elements or sections of the body previously described are presented.

Having thus described the invention, what is claimed as new and desired to be secured by Letters Patent is as follows:

1. A metallic hammer-driven fastener for use in such materials as steel and iron including a body portion having a plurality of hardened criss-cross peripheral body elements adapted to broach a cylindrical aperture in a work piece when longitudinally driven therein, the elements in the vicinity of the entering end of the fastener being adapted to broach a smaller diameter than the elements receding from said entering end, said hardened peripheral body elements being separated by body indentations inwardly decreasing in circumferential cross-sections.

2. A metallic hammer-driven fastener for use in such materials as steel and iron including a body portion having a plurality of hardened peripheral body elements adapted to broach a cylindrical aperture in a work piece when longitudinally driven therein, the elements in the vicinity of the entering end of the fastener being adapted to broach a smaller diameter than the elements receding from said entering end, said hardened peripheral body elements being separated by pyramidal body indentations.

3. A metallic hammer driven fastener for use in such materials as steel and iron and including a body portion having a plurality of hardened criss-cross surface portions defined by spaced depressions, said hardened surface portions forming continuous working edges adapted to broach a cylindrical aperture in a work piece when longitudinally driven therein, said body portion at the entering end having an outwardly opening recess extending axially of said body portion to enable the collapsing of said entering end and thereby facilitate the initial broaching action of the working edges of the criss-cross surface portions located in the vicinity of the entering end of the fastener.

CARL G. OLSON.